United States Patent
Shiu et al.

(10) Patent No.: US 7,412,766 B2
(45) Date of Patent: Aug. 19, 2008

(54) METHOD OF FABRICATING COIL-EMBEDDED INDUCTOR

(75) Inventors: Ming-Shan Shiu, Taoyuan Hsien (TW); Cheng-Hong Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 420 days.

(21) Appl. No.: 11/174,613

(22) Filed: Jul. 6, 2005

(65) Prior Publication Data

US 2006/0009000 A1  Jan. 12, 2006

(30) Foreign Application Priority Data

Jul. 9, 2004  (TW) ................ 93120594 A

(51) Int. Cl.
*H01F 7/06* (2006.01)
(52) U.S. Cl. .................. 29/606; 29/607; 228/175; 228/180.22; 228/219; 336/83; 336/110; 336/175; 336/178; 336/184; 363/17; 363/48; 363/58

(58) Field of Classification Search ............... 29/602.1, 29/604, 606, 607; 228/175, 180.22, 219; 336/83, 110, 175, 178, 184, 214, 215, 234; 363/17, 48, 58; 100/214; 438/300
See application file for complete search history.

(56) References Cited

U.S. PATENT DOCUMENTS

| 6,311,387 B1 * | 11/2001 | Shikama et al. ............ 29/602.1 |
| 2001/0016977 A1 | 8/2001 | Moro et al. |
| 2002/0002771 A1 * | 1/2002 | Lin et al. .................. 29/602.1 |
| 2003/0141952 A1 | 7/2003 | Moro et al. |

* cited by examiner

*Primary Examiner*—Paul D Kim
(74) *Attorney, Agent, or Firm*—Birch, Stewart, Kolasch & Birch, LLP

(57) ABSTRACT

A method of fabricating a coil-embedded inductor provides steps for obtaining uniform density of coil-embedded inductor. The cavity of a first die is filled with dust before being flipped, and then filled with dust a second time. The dust in the cavity is pressed only once for improving the density.

17 Claims, 9 Drawing Sheets

METHOD OF FABRICATING COIL-EMBEDDED INDUCTOR

BACKGROUND

The present invention relates to a method of fabricating an inductor, and particularly to a method of fabricating a coil-embedded inductor.

Generally, an inductor comprises an iron core wound by a coil. Coil-embedded inductors are utilized to provide an inductor with reduced volume.

Refer to FIGS. 1A to 1D and 2A to 2D together. FIGS. 1A, 1B, 1C, and 1D show a coil of a conventional coil-embedded inductor. FIGS. 2A, 2B, 2C, and 2D show a conventional coil-embedded inductor. In fabrication of the coil-embedded inductor, a wrapped coil 1 with two terminals 10 is enclosed by a core housing 20, exposing the terminals 10, as shown in FIG. 2A and FIG. 2B.

Ferrite powder and ferromagnetic metal powder are widely used to form the iron core by powder die-casting. With ferrite powder, powder sintering is further required to increase inductance and strength of the iron core. As a result, ferromagnetic metal powder is utilized more frequently due to enhanced magnetic flux density and DC-bias characteristics.

U.S. Publication No. 2001/0016977 discloses a method of fabricating a coil-embedded inductor, in which an iron core base 2 illustrated in FIG. 2 of this art thereof is formed previously, and a coil is inserted therein later. Press forming completes fabrication of the coil-embedded inductor. Detailed process of the method is illustrated in FIG. 5A to FIG. 5I of the related art thereof. This method, however, requires iron core base 2 to be fabricated prior to press forming, such that a gap may occur between the iron core base 2 and the coil due to non-uniform density distribution. The area near the gap shows increased magnetic flux density, achieving magnetic saturation easily, affecting the electrical characteristics of the coil-embedded inductor.

U.S. Publication No. 2003/0141952 discloses another method of fabricating a coil-embedded inductor, described with reference to FIG. 3 and FIG. 11A to FIG. 11D of this art thereof. The terminals of the coil are bent to a single plane. The coil is then placed in a die for formation of the coil-embedded inductor. Due to this reason, resistance of the coil-embedded inductor will increase from the bent terminals of the coil results in heat production at high electric current levels, affecting the electrical characteristics of the coil-embedded inductor.

As a result, there is a need for a coil-embedded inductor with a core housing having uniform density distribution.

SUMMARY

Accordingly, embodiments of the invention disclose a method of fabricating a coil-embedded inductor, comprising: providing a first die with a cavity, disposing a coil positioning die in the first die via a first end of the cavity, disposing a coil in the cavity of the first die, wherein the coil is positioned on the coil positioning die, performing a first dust filling process on the cavity of the first die, disposing a second die in the first die via a second end of the cavity of the first die, reversing the first die with the coil positioning die and the second die, removing the coil positioning die from the first die, performing a second dust filling process to the cavity of the first die, disposing a third die in the first die via the cavity of the first die, and pressing the second die and the third die.

Another method of fabricating a coil-embedded inductor comprises: providing a first die with a cavity, disposing a coil positioning die in the first die via a first end of the cavity of the first die, disposing a coil with a terminal in the cavity of the first die via a second end thereof, wherein the coil is positioned on the coil positioning die and the terminal is fixed in a terminal supporting base of the first die, connecting a supplementary die to the second end of the first die, wherein the supplementary die comprises a terminal fixing block corresponding to the terminal supporting base of the first die, with the terminal is fixed by the first die and the supplementary die and a cavity of the supplementary die has the same cross section as the cavity of the first die, performing a first dust filling process on the cavity of the first die, disposing a second die in the supplementary die via the cavity of the supplementary die, reversing the first die with the coil positioning die, the supplementary die, and the second die, removing the coil positioning die from the first die, performing a second dust filling process to the cavity of the first die, disposing a third die in the first die via the cavity of the first die, and pressing the second die and the third die.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

Disclosed is a coil-embedded inductor in which the terminals of the coil are not limited to a single plane.

An embodiment of the fabrication process of the coil-embedded inductor according to the method is hereinafter described in detail with reference to FIG. 3A to FIG. 3L in sequence.

Figure 3A:
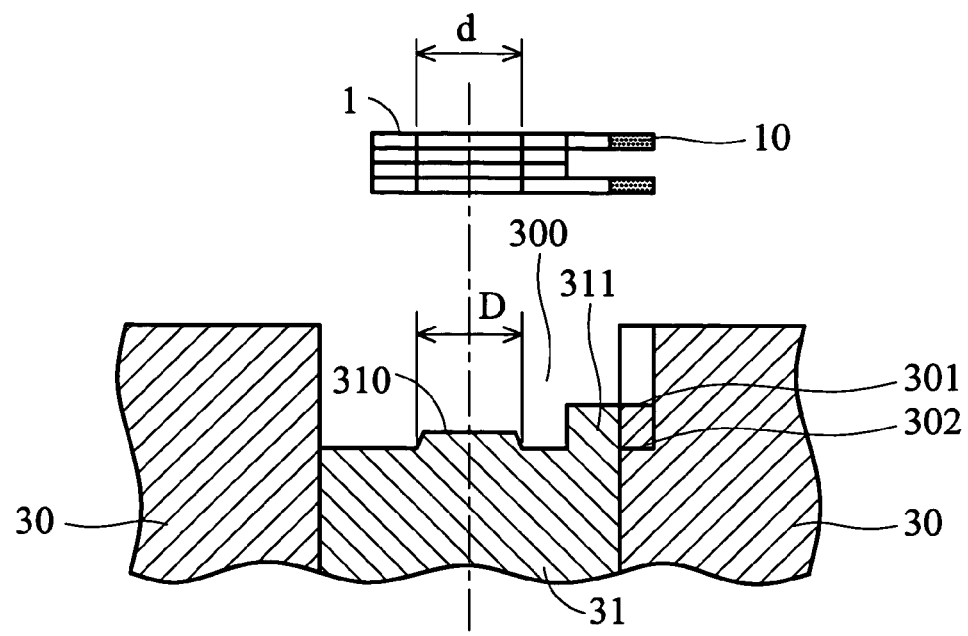
FIG. 3A is a cross-section of an embodiment of the first die before the coil is disposed therein according to the present invention.

As shown in FIG. 3A, a first die 30 with a cavity 300 in the center thereof is provided. A coil positioning die 31 is disposed in the first die 30 via a first end (i.e. the bottom end in FIG. 3A) of the cavity 300 and is movable therein. When the coil positioning die 31 moves to a fixed position as shown in FIG. 3A, the coil positioning die 31 is temporarily fixed to receive the coil 1. A first positioning block 310 and a second positioning block 311 are disposed at the top surface of the coil positioning die 31. The first positioning block 310 is conical or cylindrical, and the second positioning block 311 is rectangular with a curved recess. The first die 30 has a first terminal supporting base 301 and a second terminal supporting base 302 on a side near the cavity 300. The first terminal supporting base 301 and the second terminal supporting base 302 are different in height.

Figure 3B:
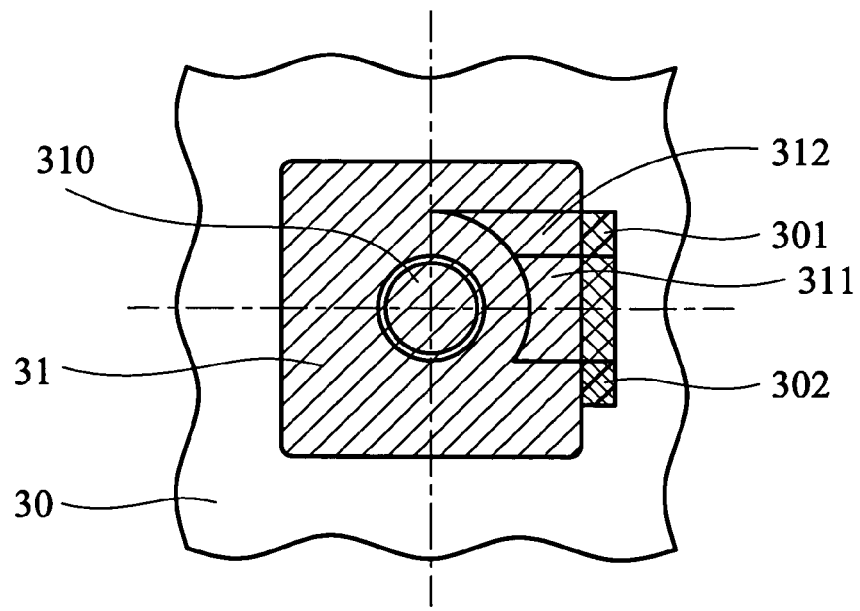
FIG. 3B is a top view of an embodiment of the first die before the coil is disposed therein.

FIG. 3B is a top view of the first die in FIG. 3A. The curved recess of the second positioning block 311 corresponds to a side of the coil 1. Shape and position of the first terminal supporting base 301 and the second terminal supporting base 302 in the first die 30 are illustrated in FIG. 3B.

Figure 1A:
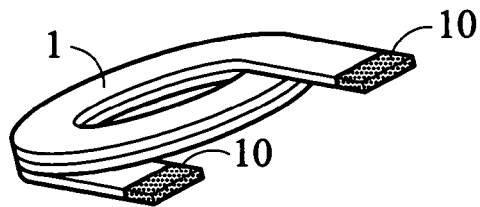
FIG. 1A is a perspective view of the coil of the conventional coil-embedded inductor.
Figure 1B:
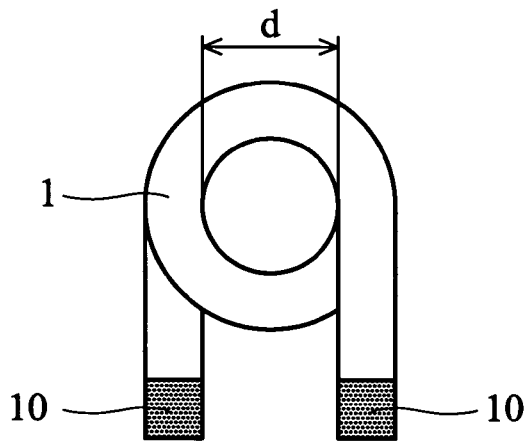
FIG. 1B is a plan view of the coil in FIG. 1A.
Figure 1C:
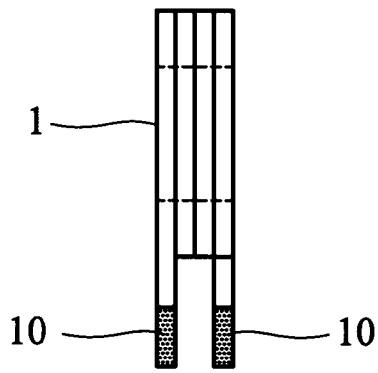
FIG. 1C is a side view of the coil in FIG. 1A.
Figure 1D:
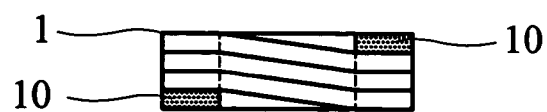
FIG. 1D is a front view of the coil in FIG. 1A.
Figure 2A:
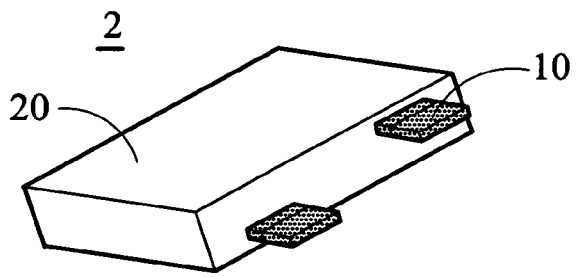
FIG. 2A is a perspective view of another conventional coil-embedded inductor.
Figure 2B:
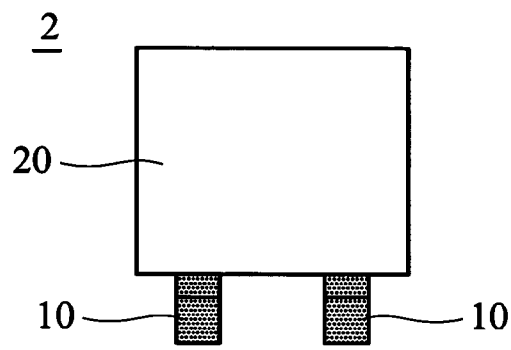
FIG. 2B is a plan view of the coil-embedded inductor in FIG. 2A.
Figure 2C:
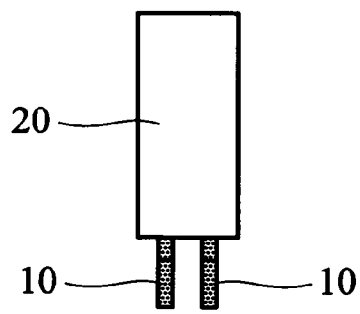
FIG. 2C is a side view of the coil-embedded inductor in FIG. 2A.
Figure 2D:
FIG. 2D is a front view of the coil-embedded inductor in FIG. 2A.
Figure 3C:
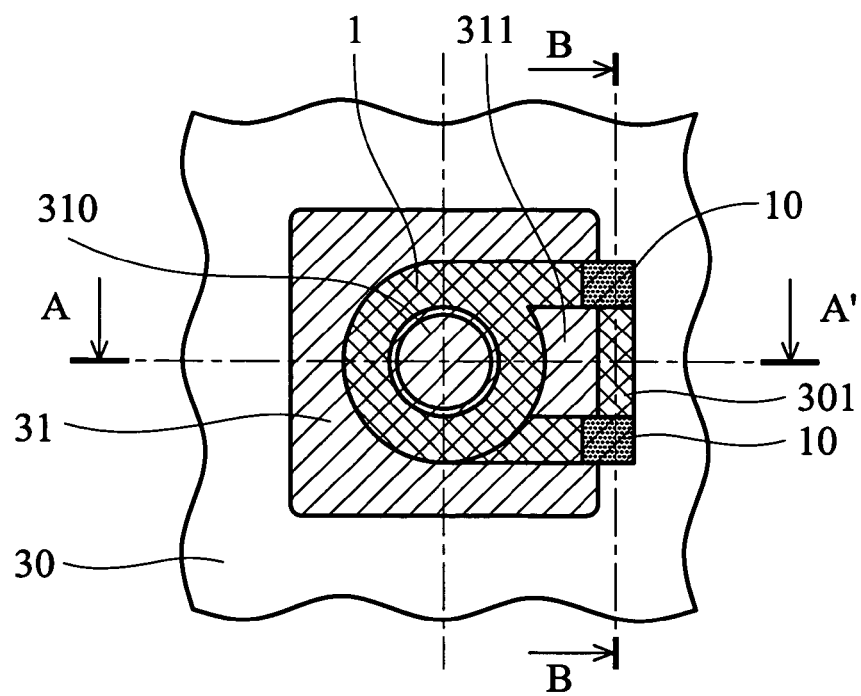
FIG. 3C is a top view of an embodiment of the first die after the coil is disposed therein.

Coil 1 is disposed in the cavity 300 of the first die 30. An outer diameter D of the bottom portion of the first positioning block 310, as shown in FIG. 3A, approximately equals an inner diameter d of the coil 1, as shown in FIG. 1A. Thus, the first positioning block 310 passes through the coil 1. The two terminals 10 of the coil 1 are positioned on opposite sides of the second positioning block 311 and supported by the terminal supporting portion 312 of the second positioning block 311. Thus, coil 1 is positioned and fixed temporarily on the upper end of the coil positioning die 31. The height difference between the first terminal supporting base 301 and the second terminal supporting base 302 may equal that between the two terminals 10 of coil 1. In this case, the two terminals 10 of coil 1 are positioned respectively on the first terminal supporting base 301 and the second terminal supporting base 302. FIG. 3C is a top view of the first die 30, in which the coil 1 in the cavity 300 of the first die 30 is clearly illustrated.

Figure 3D:
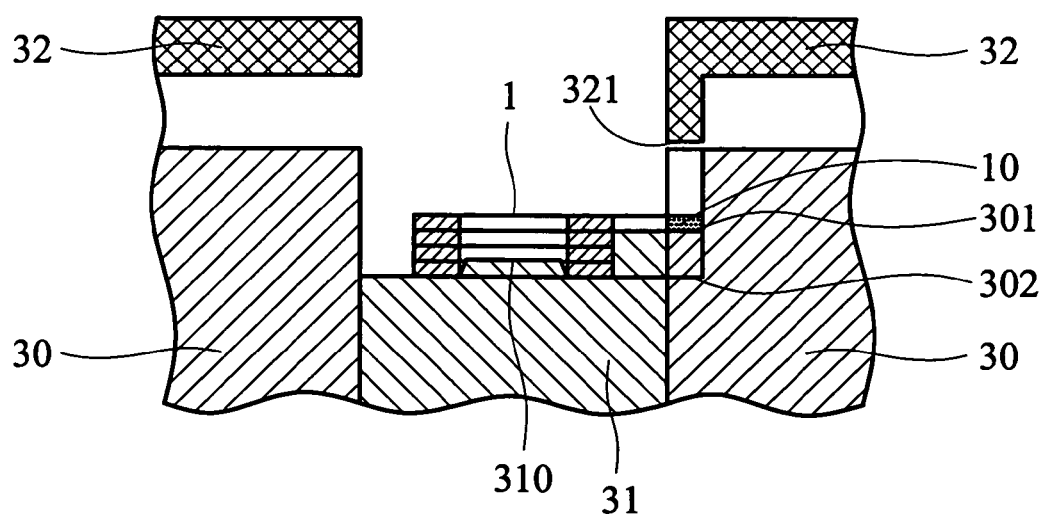
FIG. 3D is a cross-section of an embodiment of the supplemental die along the A-A' direction in FIG. 3C before disposal in the first die.
Figure 3E:
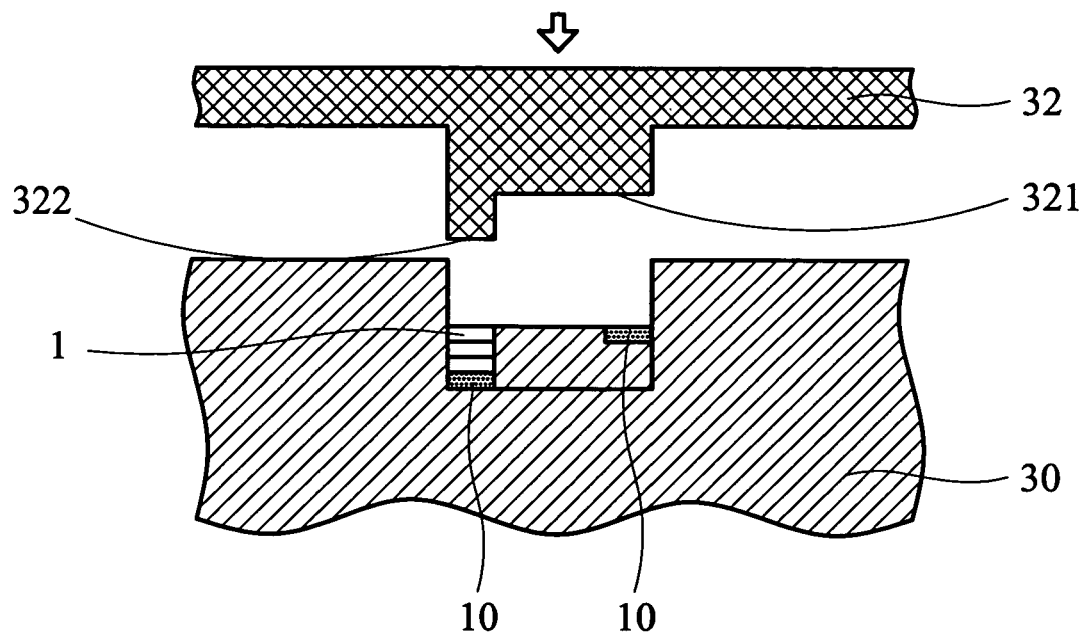
FIG. 3E is a cross-section of an embodiment of the supplemental die along the B-B' direction in FIG. 3C before disposal in the first die.

When coil 1 is disposed in the cavity 300 of the first die 30, as shown in FIG. 3D and FIG. 3E, a supplementary die 32 is disposed on the first die 30. The supplemental die 32 has two terminal fixing blocks 321, 322 respectively corresponding to the first terminal supporting base 301 and the second terminal supporting base 302. The shapes of the terminal fixing blocks 321, 322 may correspond to those of the first terminal supporting base 301 and the second terminal supporting base 302. The cavity of the supplemental die 32 is similar in shape to the cavity 300 of the first die 30.

Figure 3F:
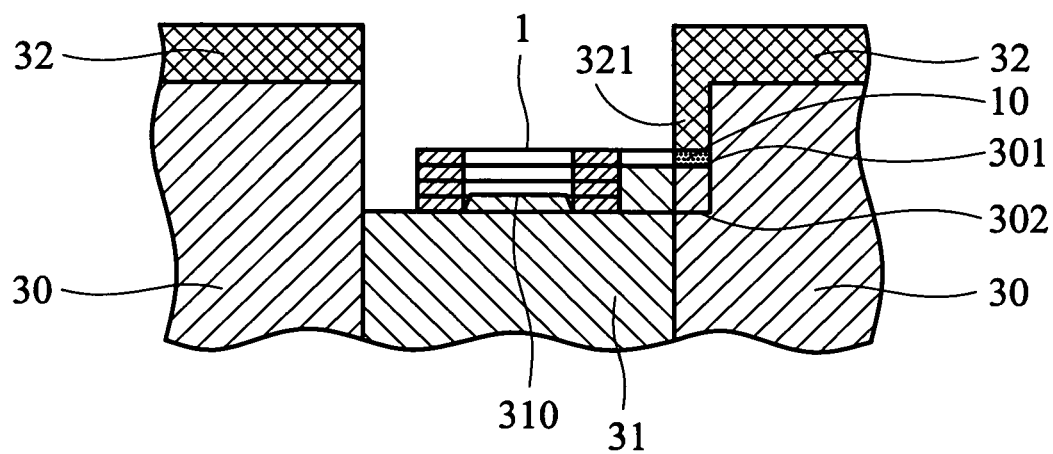
FIG. 3F is a cross-section of an embodiment of the supplemental die along the A-A' direction in FIG. 3C after disposal in the first die.
Figure 3G:
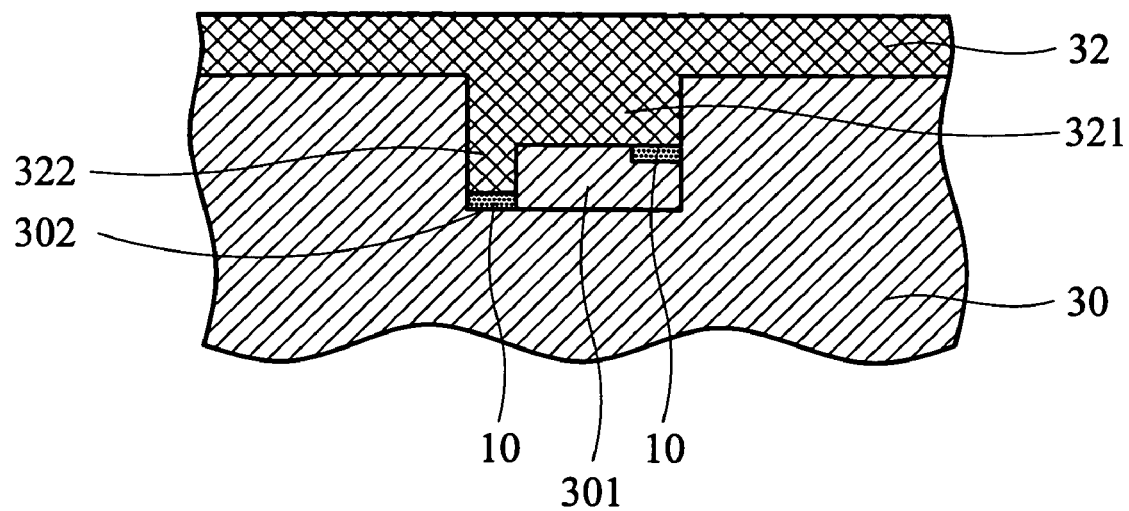
FIG. 3G is a cross-section of an embodiment of the supplemental die along the B-B' direction in FIG. 3C after disposal in the first die.

Referring to FIGS. 3E, 3F and 3G, when the supplemental die 32 is disposed on the first die 30, the terminals 10 are respectively clamped between the terminal fixing blocks 321, 322 and the terminal supporting bases 301, 302. Thus, the coil 1 is positioned and fixed in a predetermined position.

Figure 3H:
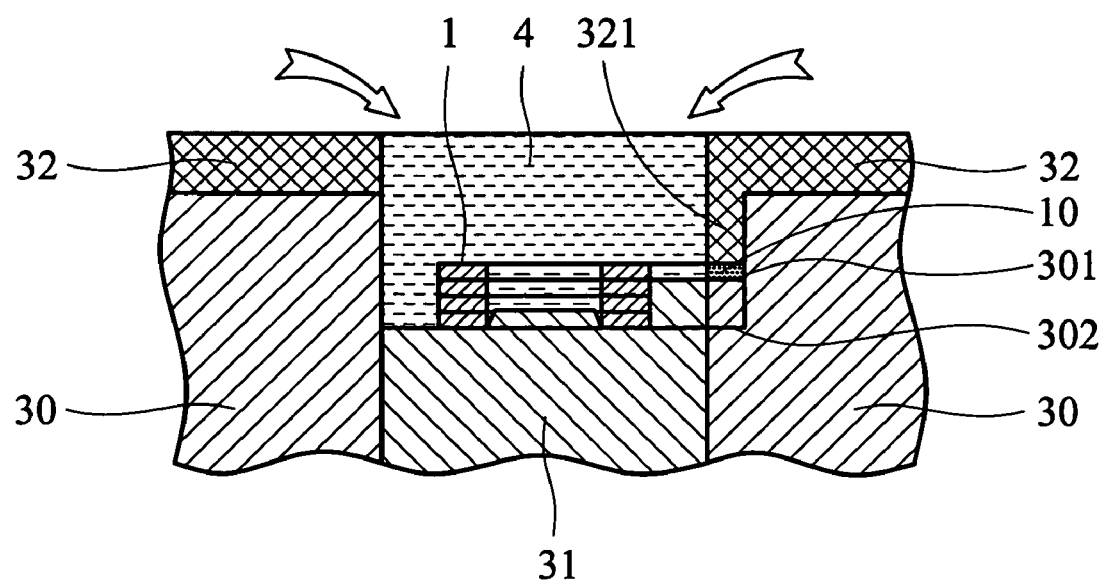
FIG. 3H is a cross-section of the first die during the first dust filling process.
Figure 3I:
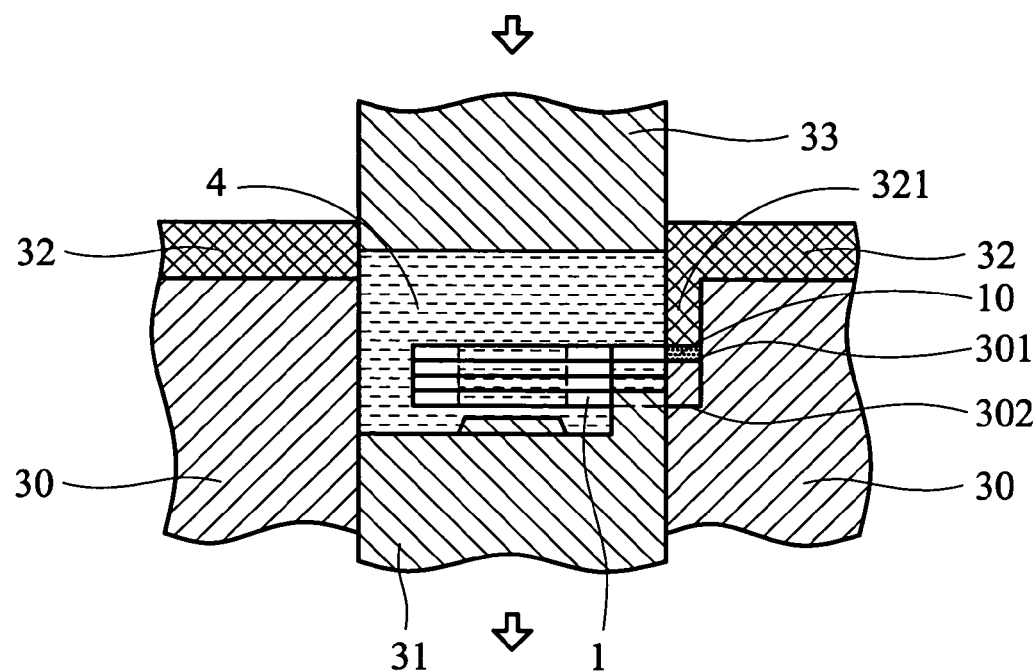
FIG. 3I is a cross-section of the first die when the second die is disposed in the cavity after the first dust filling process.
Figure 3J:
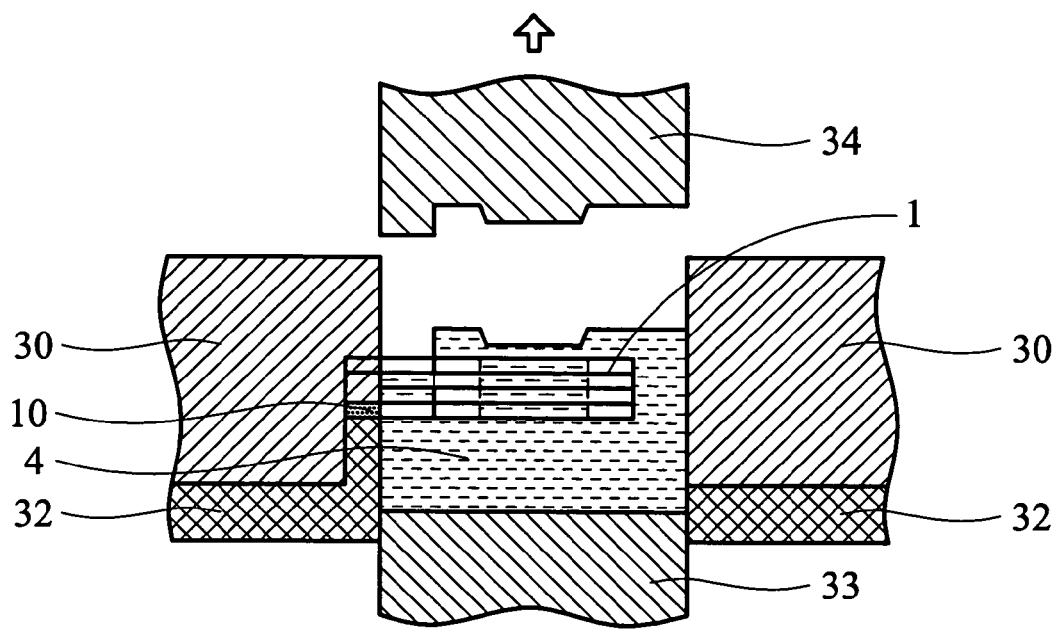
FIG. 3J is a cross-section of the first die when the first die is flipped and the coil positioning die is removed from the first die.
Figure 3K:
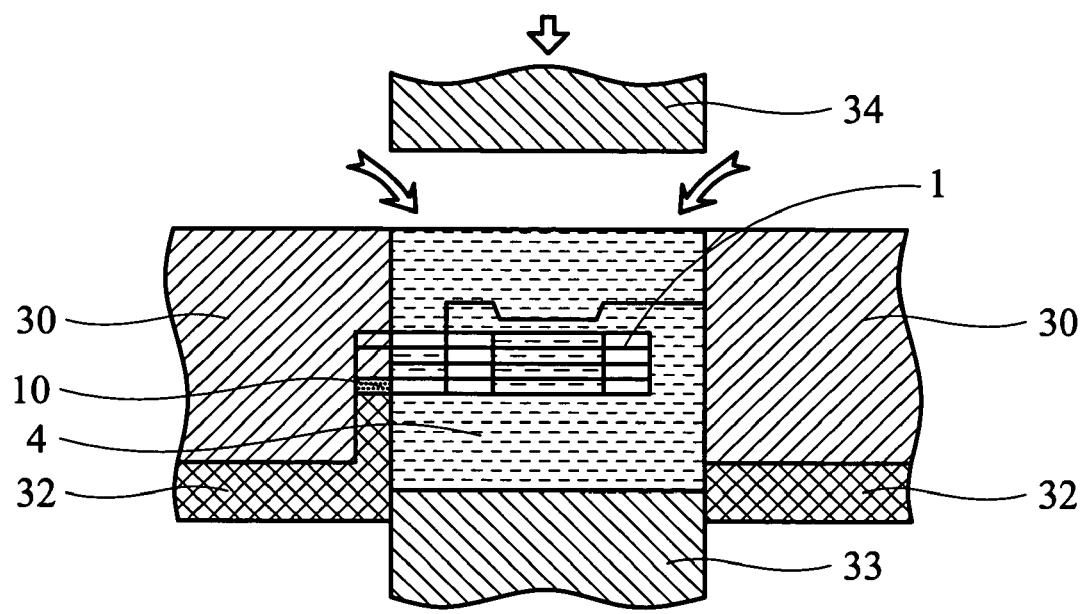
FIG. 3K is a cross-section of the first die during the second dust filling process.
Figure 3L:
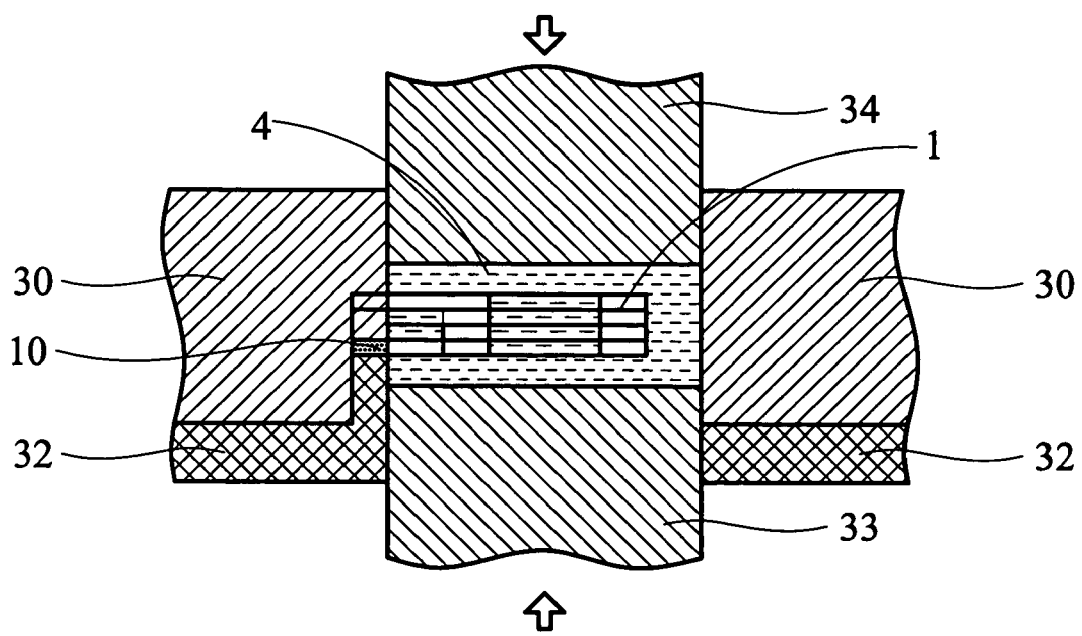
FIG. 3L is a cross-section of the first die when the third die is disposed in the cavity of the first die and a force is applied to the second die and the third die.
Figure 3M:
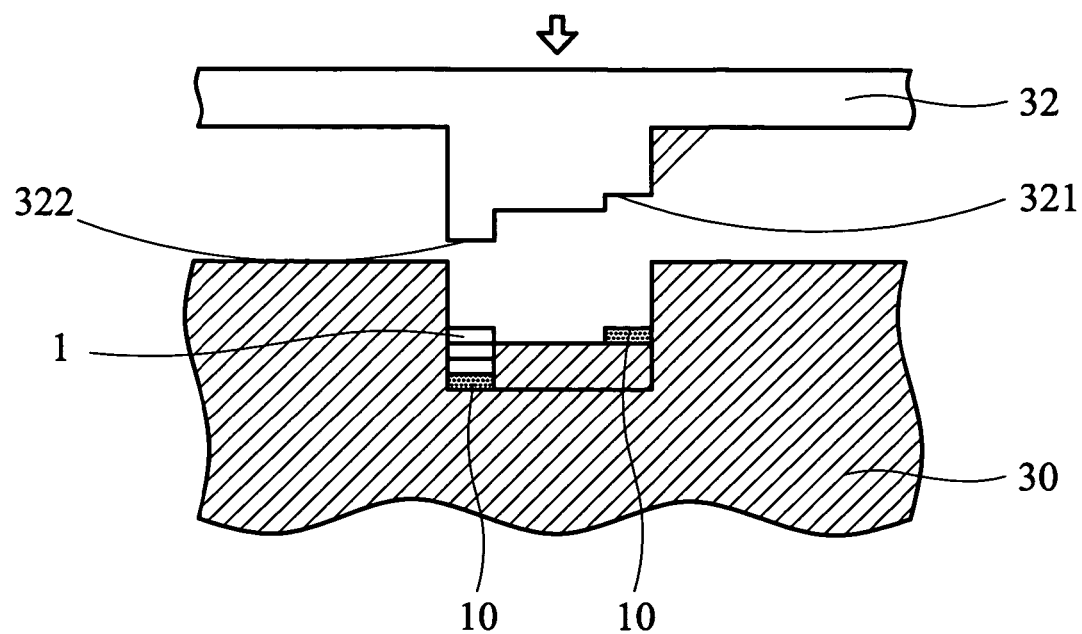
FIG. 3M is a cross-section of another embodiment of the supplemental die along the B-B' direction in FIG. 3C before disposal in the first die.
Figure 3N:
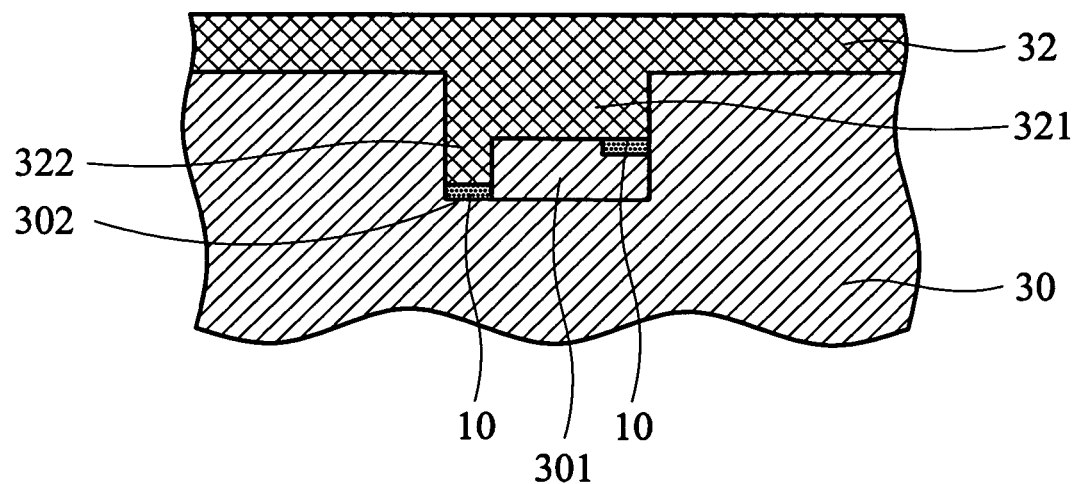
FIG. 3N is a cross-section of yet another embodiment of the supplemental die along the B-B' direction in FIG. 3C after disposal in the first die.

In another embodiment as shown in FIG. 3M and FIG. 3N, a recess is disposed on terminal fixing block 321 to contain the terminal 10, and the shapes of terminal fixing blocks 321, 322 also may correspond to those of the first terminal supporting base 301 and the second terminal supporting base 302. Therefore, the coil 1 is clamped by the supplementary die 32 and the first die 30, and positioned and fixed in the predetermined position.

In some embodiments, the supplemental die 32 may be omitted. In this case, only the first die is provided, and two terminal supporting holes (not shown) in the cavity of the first die fix the terminals.

A first dust filling process is performed as shown in FIG. 3H to fill dust 4 in the cavity 300. The material of the dust is selected from ferromagnetic metal powder and Ferrite powder.

Further, as shown in FIG. 3I, a second die 33 is disposed in the supplementary die 32 via the cavity of the supplementary die 32. Simultaneously, the second die 33 and the coil positioning die 31 are moved downward and through the cavity of the first die 30, preferably at the same speed, to force the dust 4 downward. With the movement, the second die 33 is disposed in the cavity 300.

It should be noted that when the second die 33 and the coil positioning die 31 move at the same speed, dust 4 is not compressed in the moving process. In some embodiments, when the second die 33 moves into the supplemental die 32, the coil positioning die 31 is not necessary simultaneous moving with the second die 33, or remain in place, dust 4 will be pre-shaped by this process. In this case, compression ratio of the pre-shaping process should be less than that of the pressing process, preferably less than 0.7 to obtain a core housing 20 with uniform density.

Further, as shown in FIG. 3J, the first die 30, comprising the supplemental die 32, the coil positioning die 31 and the second die 33 therein, is reversed, and the coil positioning die 31 is removed from the first die 30. Then, a second dust filling process fills dust 4 into the cavity 300 of the first die 30 as shown in FIG. 3K. The material of the dust is also selected from ferromagnetic metal powder and Ferrite powder.

Further, as shown in FIG. 3L, a third die 34 is disposed in the first die 30 via the cavity 300, with force applied to and pressing the second die 33 and the third die 34. The coil-embedded inductor is thus complete. The coil-embedded inductor can be removed from the first die 30 along with the supplemental die 32.

The core housing 20 of the coil-embedded inductor is obtained by pressing only in the final step, such that uniform density can be provided. Further, by adjusting the position of the terminal supporting bases of the first die and the terminal fixing blocks of the supplemental die, coils with terminals of different heights or on different sides can be utilized.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating a coil-embedded inductor, comprising steps of:
providing a first die with a cavity, and disposing a coil positioning die therein from a first end of the cavity;
disposing a coil in the cavity of the first die, wherein the coil is positioned on the coil positioning die;
filling a first dust into the cavity;
disposing a second die into the cavity of the first die from a second end of the cavity;
reversing the first die with the coil positioning die and the second die, and removing the coil positioning die from the first die;
filling a second dust into the cavity of the first die; and
disposing a third die into the cavity of the first die from the first end of the cavity, and pressing the second die and the third die in the cavity of the first die.

2. The method of fabricating a coil-embedded inductor as claimed in claim 1, wherein a terminal of the coil is fixed in a terminal supporting hole of the first die.

3. The method of fabricating a coil-embedded inductor as claimed in claim 1, wherein the coil positioning die comprises a first positioning block disposed on a surface of the coil positioning die for positioning the coil, the first positioning block fixing the coil in a predetermined position when the coil is disposed on the surface of the coil positioning die.

4. The method of fabricating a coil-embedded inductor as claimed in claim 3, wherein the first positioning block is conical or cylindrical.

5. The method of fabricating a coil-embedded inductor as claimed in claim 1, wherein the coil positioning die further comprises a second positioning block for positioning a terminal of the coil.

6. The method of fabricating a coil-embedded inductor as claimed in claim 1, wherein the first die comprises two terminal supporting holes for fixing two terminals of the coil.

7. The method of fabricating a coil-embedded inductor as claimed in claim 1, wherein the second die and the coil positioning die are simultaneously moved at the same speed to locate the second die in the first die when the second die is disposed in the first die from the second end of the cavity of the first die.

8. The method of fabricating a coil-embedded inductor as claimed in claim 1, wherein the coil positioning die remains in place, when the second die is disposed in the cavity of the first die.

9. The method of fabricating a coil-embedded inductor as claimed in claim 8, wherein a compression ratio of the pre-shaping process to the pressing process is less than 0.7.

10. The method of fabricating a coil-embedded inductor as claimed in claim 1, further comprising a step of providing a supplementary die connected to the first die when the coil is disposed in the cavity of the first die, the supplementary die comprising a terminal fixing block corresponding to a first terminal supporting base of the first die, wherein a terminal of the coil is fixed by the first die and the supplementary die and a cavity of the supplementary die has the same shape as the cavity of the first die.

11. The method of fabricating a coil-embedded inductor as claimed in claim 10, wherein the first die further comprises a second terminal supporting base, and the first terminal supporting base and the second terminal supporting base support two terminals of the coil.

12. The method of fabricating a coil-embedded inductor as claimed in claim 11, wherein the first terminal supporting base and the second terminal supporting base are of different heights.

13. The method of fabricating a coil-embedded inductor as claimed in claim 11, wherein the first and second terminal supporting bases with the terminals disposed therein are shaped corresponding to the terminal fixing blocks.

14. The method of fabricating a coil-embedded inductor as claimed in claim 11, wherein the second die and the coil positioning die move toward the first die at the same speed when the second die is disposed in the supplementary die via the cavity thereof.

15. The method of fabricating a coil-embedded inductor as claimed in claim 11, wherein the coil positioning die remains in place when the second die is disposed in the cavity of the supplementary die.

16. The method of fabricating a coil-embedded inductor as claimed in claim 15, wherein a compression ratio of the pre-shaping process to the pressing process is less than 0.7.

17. The method of fabricating a coil-embedded inductor as claimed in claim 1, wherein the first dust and the second dust are the same material which is selected from ferromagnetic metal powder and Ferrite powder.

* * * * *